United States Patent [19]

Kiffmeyer et al.

[11] 3,806,877

[45] Apr. 23, 1974

[54] PROGRAMMABLE CONTROLLER EXPANSION CIRCUIT

[75] Inventors: William W. Kiffmeyer, Bayside; Louis G. Baron, New Berlin, both of Wis.

[73] Assignee: Allen-Bradley Company, Milwaukee, Wis.

[22] Filed: July 28, 1971

[21] Appl. No.: 166,796

[52] U.S. Cl. .............................................. 340/172.5
[51] Int. Cl. .............................................. G06f 9/00
[58] Field of Search .................................. 340/172.5

[56] References Cited

UNITED STATES PATENTS

| | | | |
|---|---|---|---|
| 3,292,151 | 12/1966 | Barnes et al. | 340/172.5 |
| 3,432,810 | 3/1969 | Cordero | 340/172.5 |
| 3,317,902 | 5/1967 | Michael | 340/172.5 |
| 3,331,056 | 7/1967 | Lethin et al. | 340/172.5 |
| 3,340,513 | 9/1967 | Kinzie et al. | 340/172.5 |
| 3,343,140 | 9/1967 | Richmond et al. | 340/172.5 |
| 3,387,283 | 6/1968 | Snedaker | 340/172.5 |
| 3,395,392 | 7/1968 | Kulikauskas et al. | 340/172.5 |
| 3,400,380 | 9/1968 | Packard et al. | 340/172.5 |
| 3,579,201 | 5/1971 | Langley et al. | 340/172.5 |
| 3,597,743 | 8/1971 | Murphy et al. | 340/172.5 |
| 3,686,639 | 8/1972 | Fletcher et al. | 340/172.5 |
| 3,753,243 | 8/1973 | Ricketts, Jr. et al. | 340/172.5 |

FOREIGN PATENTS OR APPLICATIONS

| | | |
|---|---|---|
| 1,126,891 | 9/1968 | Great Britain |

OTHER PUBLICATIONS

"PDP-14 and PDP-14/L Programmable Controller" in 1971 Digital Control Handbook, Sept. 1970, pp. 361-379.

Lapidus, G., "Programmable Logic Controllers–Painless Programming to Replace the Relay Bank" in Control Engineering, April, 1971, pp. 49-60.

*Primary Examiner*—Paul J. Henon
*Assistant Examiner*—Melvin B. Chapnick
*Attorney, Agent, or Firm*—Barry E. Sammons

[57] ABSTRACT

A programmable controller has six address banks, each bank containing a plurality of input and output circuits. A summing circuit comprised of logic gates is connected to each address bank by an address bank bus. An electronic switch circuit connected to an address decoder and operation decoder operates in response to an instruction read from a memory matrix to enable one of three buses connected to the summing circuit. A gate circuit also connects to the address and operation decoders and activates either an EXP or $\overline{EXP}$ bus connected to the summing circuit in response to an instruction read from the memory matrix. The input and output circuits in each address bank are connected to the address decoder, and a circuit in an address bank is paged when its address is decoded from an instruction read from the memory matrix, when its address bank has been enabled by the electronic switch circuit, and when its address bank has been activated by the gate circuit.

6 Claims, 4 Drawing Figures

INVENTORS
WILLIAM W. KIFFMEYER
LOUIS G. BARON

BY Barry E. Sammons
ATTORNEY

INVENTORS
WILLIAM W. KIFFMEYER
LOUIS G. BARON

BY Barry E. Sammons
ATTORNEY

INVENTORS
WILLIAM W. KIFFMEYER
LOUIS G. BARON
BY
Barry E. Sammons
ATTORNEY

PROGRAMMABLE CONTROLLER EXPANSION CIRCUIT

BACKGROUND OF THE INVENTION

The invention relates to means for expanding the input-output capacity of programmable logic controllers, and more specifically, to a means of expanding the input-output capacity of a programmable logic controller like that described in the copending U.S. Pat. application Ser. No. 137,923, filed on Apr. 27, 1971 and entitled "Programmable Matrix Controller."

Programmable controllers accept input signals that indicate the condition of various input devices such as limit switches, push buttons, solenoids and photoelectric cells, compare these input conditions to the conditions specified in a stored program, and energize or deenergize output devices in accordance with the instructions in the program. The various input devices are attached to machine tools, or other industrial apparatus, and each device is connected to a specific input circuit in the controller. Likewise, the various output devices are attached to the machine too, or other controlled industrial apparatus, and each is connected for actuation by a specific output circuit in the controller. The controller program is stored in a memory matrix in the form of a series of one-word instructions. Each instruction is comprised of an operation code and an address code. For example, the instruction may direct the controller to read the condition (an operation) of a specific input device designated by the address code. Or, an instruction may command the controller to activate (an operation) a specific output device designated by the address code. In other words, each input or output device is connected to a specific input or output circuit in the controller, which circuit in turn is associated with and activated by an address code in an instruction of the program.

Each instruction is a binary word comprised of a plurality of bits. The number of bits in each instruction is limited by the type of memory matrix used in the controller. For example, commercially available memory matrices typically used in controllers are limited to eight-, 12–, or 16–bit words. In the controller described in the above cited copending patent application, the memory matrix can store 64 eight-bit words. Because two of the bits in each instruction are used for the operation code, six bits are left for the address code. By using standard decoding methods it is possible, therefore, to directly designate 64 addresses with one-word address codes. In other words, using standard decoding circuits, a maximum of 64 addressable input-output devices can be controlled by the programmable controller described in the above cited copending application.

Of course, the capacity of the memory matrix can be increased so that increased word sizes can be accommodated and a larger number of attached input-output devices can be addressed. However, such a solution is expensive, both in terms of the cost of the memory matrix, and the cost of the additional hardware needed to decode each instruction.

SUMMARY OF THE INVENTION

The present invention provides an improved means of expanding the number of input-output devices attached to a controller having a memory matrix of limited word size. More specifically, the invention comprises a means of increasing the input-putput capacity of a programmable controller by using addressable operation instructions to switch to and between additional banks; and by converting non-addressable operation instructions into addressable instructions which are directed to a separate additional address bank.

In programmable controllers generally, and in the controller described in the above cited copending patent application particularly, distinct operating signals are decoded from an operation code in each instruction read from memory. These operations include passive operations such as examine input closed (XIC), and examine input open (XIO); and active operations such as store the result of a tested branch (BRT), and operate an output device (SET), The XIC, XIO and SET operations pertain to a specific input or output device, and therefore, their instruction includes a six-bit address code. The BRT operation, however, is non-addressable. The BRT instruction is not associated with any specific input or output device, but instead, operates the central logic unit in the controller.

The present invention comprises first a method and means of expanding the input-output capacity of a programmable controller by performing an addressable operation automatically when a non-addressable operation code is accompanied by an address code. More specifically, when a BRT instruction containing an address is read from the memory matrix, a gate circuit operates to activate a second address bank containing addressable circuits. Such an instruction also operates to automatically direct the central logic unit of the controller to perform an addressable operation on the addressed circuit in the second address bank. The programmable controller to which the gate circuit is attached has an operation decoder which receives the operation code in each instruction read from memory and generates an operation signal in response thereto. Such controllers also have an address decoder which generates an activate signal in response to an address code in each instruction read from the memory. The gate circuit is connected to receive both an operation signal generated in response to a non-addressable instruction, and an activate signal generated in response to an accompanying address code; and in response thereto, deactivate a first address bank, activate operation. Although the address code is associated with a specific circuit in each address bank, only the circuit in the activated, second address bank is paged by the instruction.

The invention also includes a means of expanding the input-output capacity of a programmable controller by means of an electronic switching circuit connected to the controller to receive an operation signal from the operation decoder and activate signals from the address decoder, the electronic switching circuit being responsive thereto to selectively enable one of a plurality of address banks. The electronic switch circuit is controlled in a manner similar to an output circuit. The address code in the controlling instruction determines the address bank to be enabled. As a result, address codes in subsequent instructions read from memory will only page circuits in the address bank which is enabled. An instruction directing the electronic switch circuit to enable another address bank must be read from the memory matrix before a circuit in that bank can be paged.

An object of the invention is to further expand the input-output capacity of a programmable controller by combining the first and second means described above. A summing circuit is included and connected to the output of the gate circuit and the output of the electronic switching circuit. A plurality of pairs of address banks are connected to the output of the summing circuit, and the summing circuit is responsive to the electronic switch circuit to selectively enable one of the pairs of address banks and responsive to the gate means to selectively activate one address bank of the enabled pair. A circuit in the enabled, activated address bank is then pageable by the address code in the instruction.

The foregoing and other objects and advantages of the invention will appear from the following description. In the description reference is made to the accompanying drawings which form a part thereof and in which there is shown a preferred embodiment of the invention. Such embodiment does not represent the full scope of the invention, but rather the invention may be employed in many different embodiments, and reference is made to the claims herein for interpreting the breadth of the invention.

DESCRIPTION OF THE PREFERRED EMBODIMENT

Figure 1:
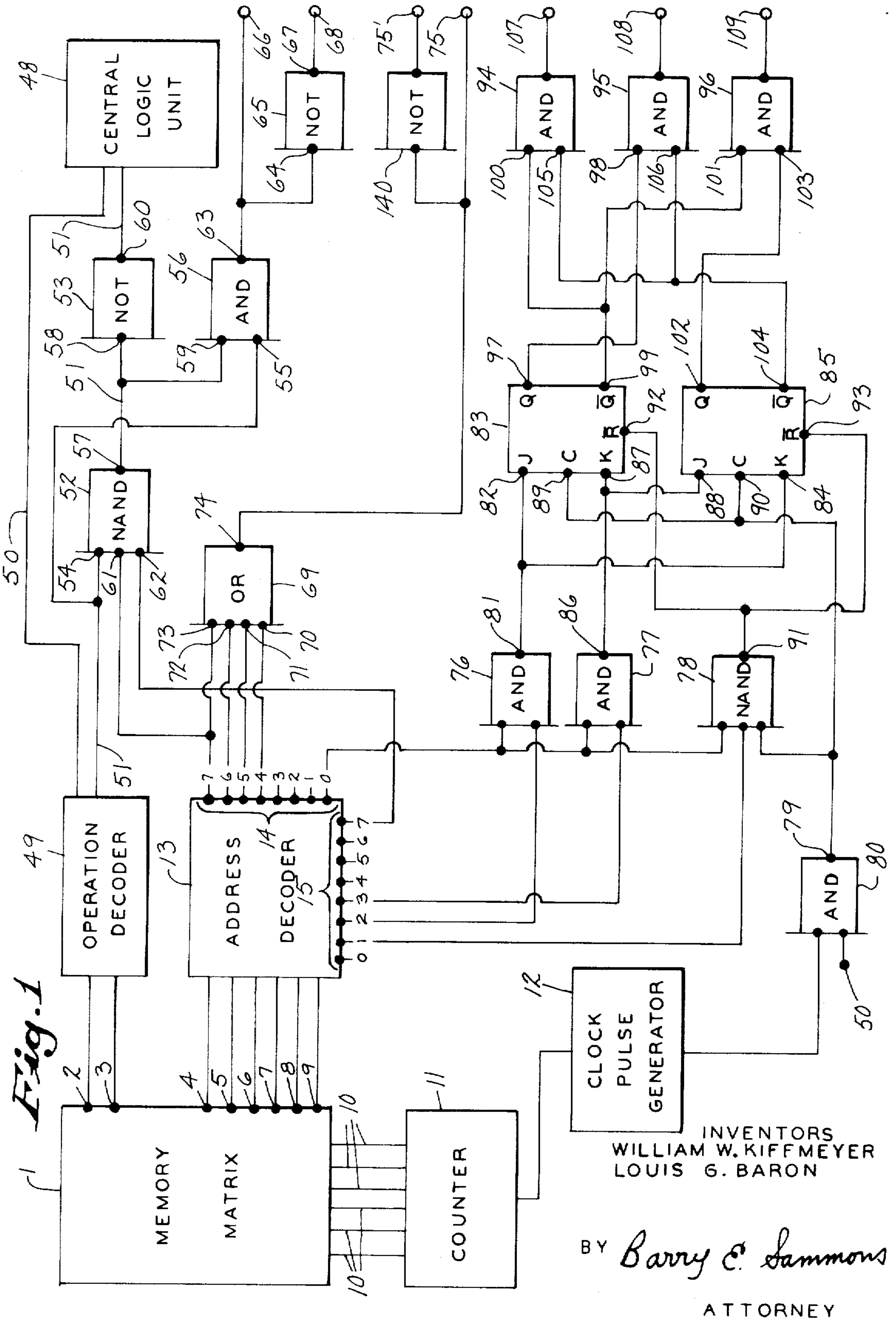
FIG. 1 is a block diagram of a portion of the programmable controller incorporating the gate circuit and electronic switch circuit of the present invention.

The digital controller as shown in FIG. 1 operates under the control of a program that is loaded into and stored in a memory matrix 1. The program is stored as a sequence of instructions, each instruction being a binary word which is eight bits (binary digits) in length. Each word, or instruction, consists of a two-bit operation code and a six-bit address code. The operation code defines the action to be taken by the digital controller, and the address code identifies a particular input or output device that is to be read or actuated by the controller.

The memory matrix 1 is a diode matrix, or read only matrix, having a capacity of 64 eight-bit words. The words are "read out" one at a time in sequence, and appear as eight digital signals one on each of two operator output lines 2 and 3 and one on each of six address output lines 4–9. The memory matrix 1 is a commercially available item which is operable in response to digital signals received at six input terminals 10 to read out one of the 64 words stored in it. A counter 11 connected to a clock pulse generator 12 generates a continuous series of six-bit digital signals to the memory matrix 1, one instruction at a time, in synchronism with a 100 kHz square wave generated by the clock pulse generator 12. When the last instruction is read out, the sequence is repeated, thus rereading the program. It should be apparent to those skilled in the art that core memory or other memory devices having different storage capacities can be substituted for the read only memory used herein.

Each word in the memory matrix 1 has a six-bit binary address code which is read out as signals through the address output terminals 4–9. An address decoder 13 is connected to receive these address output signals. Each set of address signals represents one of the octal numbers 0–77. The address decoder 13 is a standard circuit which reads each set of address signals and generates in response thereto an activate signal at one of eight most significant digit output terminals $\mathbf{14}_{0-7}$ and at one of eight least significant output terminals $\mathbf{15}_{0-7}$. For example, when the octal number, or address 47 is contained in the address code of an instruction which is read out of the memory matrix 1, the address decoder 13 generates a positive activate signal at the most significant digit output terminal $\mathbf{14}_4$ and at the least significant digit output terminal $\mathbf{15}_7$.

Each of the decoder output terminals $\mathbf{14}_{0-7}$ is paired with one of the decoder output terminals $\mathbf{150}_{0-7}$ to form a set of 64 separate addresses. Physically, therefore, each address is a pair of leads connected to the address decoder 13 which generates a logic high, or activate signal at those leads when the corresponding address code is read from the memory matrix 1. A total of 64 input-output circuits can be directly attached to the address decoder 13, as described in the above cited copending application, and selectively activated by an address code in the instruction read from the memory matrix 1. The present invention comprises a means of expanding the input-output capacity of the programmable controller beyond this 64 address capacity.

Figure 3:
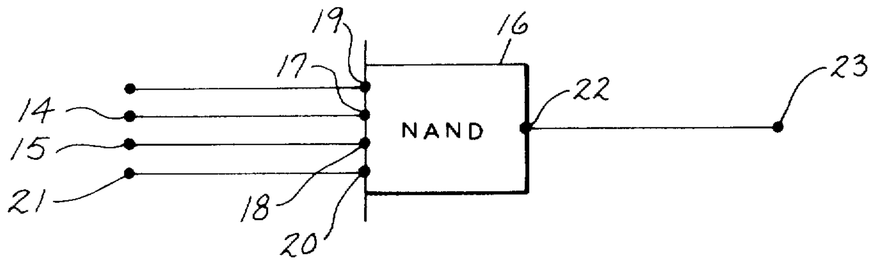
FIG. 3 is a schematic diagram of an input circuit contained in the address banks of FIG. 2.

As shown in FIG. 3, each one of the input circuits in the controller is located at an address and is comprised of a NAND gate 16 having an input terminal 17 connected to a most significant output terminal 14 of the address decoder 13, and an input terminal 18 connected to a least significant digit output terminal 15 of the address decoder 13. A third NAND gate input terminal 19 is connectable to an external device such as a limit switch or other input device. Although the choice of polarity is arbitrary, a logic high condition signal is received at the input terminal 19 from such an external input device when it is actuated, or closed. A fourth NAND gate input terminal 20 is connectable to an address bank bus 21, the connection of which will be described below.

When the NAND gate 16 is addressed, logic highs are applied to its input terminals 17 and 18 by the address decoder 13. Additionally, if the NAND gate 16 is paged, a logic high is applied to its input terminal 20 through the address bank bus 21. As a result a logic low is generated at its output terminal 22 when the external device actached to its input terminal 19 is actuated, or closed. The output terminal 22 of each input circuit connects to a single logic input bus 23, and thus, when any one of the controller input circuits is paged, the state, or condition, of its attached external device can be read by monitoring the logic state of the input bus 23. When a condition signal is received from the external device, a logic low is applied to the logic input bus 23, otherwise, the bus remains high.

Figure 4:
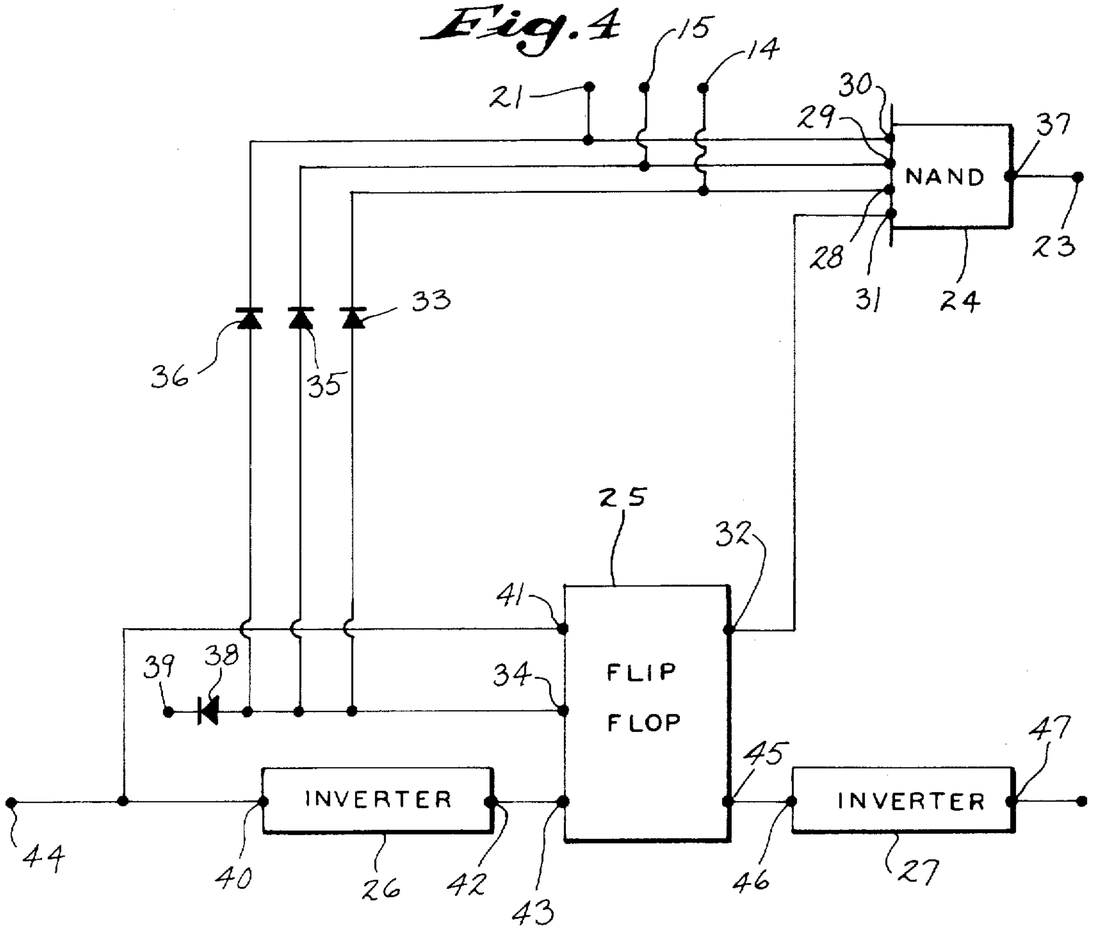
FIG. 4 is a schematic diagram of an output circuit contained in the address banks of FIG. 2.

Referring to FIG. 4, each one of the output circuits in the controller is located at an address and includes a NAND gate 24, a J–K flip-flop 25, an input inverter 26, and an output inverter 27. Two input terminals 28 and 29 on the NAND gate 24 connect to a pair of address decoder output terminals 14 and 15, respectively. A third NAND gate input terminal 30 connects to the expansion bus 21, and a fourth NAND gate input terminal 31 connects to a Q terminal 32 on the J–K flip-flop 25. The NAND gate input terminal 28 connects through a first coupling diode 33 to a clock terminal 34 on the J–K flip-flop 25, the NAND gate input terminal 29 connects through a second coupling diode 35 to the clock terminal 34, and the third NAND gate input terminal 30 connects through a third coupling diode 36 to the clock terminal 34. An output terminal 37 on the NAND gate 24 of each output circuit connects to the logic input bus 23. The clock terminal 34 of each output circuit connects through a diode 38 to a clock pulse bus 39 leading to the controller central logic unit to be described below. An input terminal 40 of the input inverter 26 connects to a J terminal 41 on the flip-flop 25 and an output terminal 42 on the input inverter 26 connects to a K terminal 43 on the flip-flop 25. The input terminal 40 and the J terminal 41 of each output circuit connect to a single logic output bus 44 leading from the controller central logic unit. A $\overline{Q}$ terminal 45 on the flip-flop 25 connects to an input terminal 46 of the output inverter 27. An output terminal 47 of the inverter 27 is connectable to an external device such as a motor starter or other controlled device.

The J–K flip-flop 25 functions to both control the output device connected to the output terminal 47, and to indicate the state, or condition, of that output device. The J–K flip-flop 25 is a standard commercially available circuit which is bistable in either a reset or set state. When reset, its Q terminal 32 is low and its $\overline{Q}$ terminal 45 is high. The flip-flop 25 is set by the trailing edge of a negative clock pulse applied to its clock terminal 34 when the output circuit is addressed through the coupling diodes 33 and 35, when the expansion bus 21 is high, and when its J terminal 41 is high. When thus set, the Q terminal 32 goes high and the $\overline{Q}$ terminal 45 goes low. The low at the $\overline{Q}$ terminal 45 is inverted to a high by the output inverter 27 and applied to actuate the controlled device connected to the output terminal 47. The flip-flop 25 is reset by the trailing edge of a clock pulse applied to its clock terminal 34 when the output circuit is paged through the coupling diodes 33, 35 and 36, and when a high is applied to its K terminal 43. When paged, the NAND gate input terminals 28, 29 and 30 are high and the condition of the Q terminal 32 of the flip-flop 25 is applied to the logic input bus 23. Thus, when the controlled device connected to the output terminal 47 is being actuated, the Q terminal 32 is high and a low is applied to the logic input bus 23. On the other hand, when the controlled device is not actuated, the logic input bus 23 remains high when the output circuit is paged.

The logic input bus 23, the logic output bus 44, and the clock pulse bus 39 connect to a central logic unit 48 shown in FIG. 1. For a more complete description of the circuit and operation of the central logic unit 48, see my copending application referred to above. In short, the central logic unit 48 operates in response to operation signals generated by an operation decoder 49; (1)to read the state of the logic input bus 23 (XIO, XIC), (2) store this information (BRT), and (3) generate command signals to the logic output bus 44 (SET). The four operation signals, XIO, XIC, BRT and SET, are decoded from a two-bit operation code read at the two operator output terminals 2 and 3 of the memory matrix 1. The operation decoder 49 receives this two-bit operation code each time a word stored in the memory matrix 1 is read, and in response, generates one of the four operation signals to the central logic unit. For example, an XIC instruction is read from the memory matrix 1 and is decoded to operate the central logic unit 48 to read the voltage level, or logic state, of the logic input bus 23. The instruction also contains an address code which is decoded to simultaneously page the desired input-output device. The condition of that device appears on the logic input bus 23 as a voltage level which is stored by the central logic unit 48 for further use. A SET instruction also contains an address code. Such an instruction causes the operation decoder 49 to generate an operation signal to the central logic unit 48 through a SET bus 50. In response, the central logic unit 48 generates a command signal through the logic output bus 44 to the output circuit paged by the instruction. A third instruction, BRT (without an address code) causes the operation decoder 49 to generate an operation signal through a BRT bus 51 to the central logic unit 48. This operation signal causes the central logic unit 48 to store the result of a group of previous instructions.

The expansion circuit now to be described is operable with the programmable controller described above to increase the number of input and output circuits that can be controlled by a program stored in the memory matrix 1.

Referring to FIG. 1, the BRT bus 51 is broken between the operation decoder 49 and central logic unit 48 to receive a gate circuit which includes a series connected NAND gate 52 and NOT gate 53. The BRT bus 51 leading from the operation decoder 49 is connected to an input terminal 54 on the NAND gate 52 and an input terminal 55 on an AND gate 56. An output terminal 57 on the NAND gate 52 is connected to an input terminal 58 on the NOT gate 53 and to a second input terminal 59 on the AND gate 56. An output terminal 60 on the NOT gate 53 connects to the central logic unit 48. A second input terminal 61 on the NAND gate 52 connects to the most significant digit output terminal $\mathbf{14_7}$ on the address decoder 13, and a third input terminal 62 connects to the least significant digit output terminal $\mathbf{15_7}$ on the address decoder 13. An output terminal 63 on the AND gate 56 connects to an input terminal 64 on a second NOT gate 65, and to an EXP bus 66. An output terminal 67 on the second NOT gate 65 connects to a $\overline{\text{EXP}}$ bus 68.

This gate circuit operates to either allow performance of the non-addressable BRT operation, or automatically perform an addressable XIC operation when the BRT operation code is accompanied by an address code. When a BRT operation is to be performed, the instruction read from the memory matrix 1 includes the BRT operation code and the code 77, which is not an address, but is decoded to generate logic highs at the decoder output terminals $\mathbf{14_7}$ and $\mathbf{15_7}$. When read, this instruction, hereinafter referred to as a BRT 77 instruction, generates a logic high at each of the three input terminals 54, 61 and 62 of the NAND gate 52. As a result, its output terminal 57 is driven low, which low is inverted by the NOT gate 53 and applied to the central logic unit 48. Concurrently, the low at the output terminal 57 of the NAND gate 52 causes the AND gate output terminal 63 and EXP bus 66 to go low. The low on the EXP bus 66 is inverted by the second NOT gate 65, and consequently, a high is generated on the $\overline{EXP}$ bus 68.

When a BRT instruction accompanied by an address code is read from the memory matrix 1, one (both) of the NAND gate input terminals 61 or (and) 62 is (are) low. As a result, the NAND gate output terminal 57 is driven to a logic high voltage, which high is inverted by the NOT gate 53. No operation signal is thus generated to the central logic unit 48, and in the preferred embodiment, the central logic unit 48 operates automatically to perform an XIC operation when no operation signals are received. Thus, a BRT instruction accompanied by an address code causes the central logic unit 48 to XIC, or read the condition of the logic input bus 23 for an input closed condition. The BRT instruction causes the gate circuit to operate the central logic unit to perform an XIC operation by "default." However, other addressable operations might also be performed. Other operations require that the gate circuit generate an operation signal to the central logic unit instead of operating it by "default" as described here. But such an operation signal is generated by the NAND gate 52, and its connection to the central logic unit 48 will provide the desired operation to be performed.

Concurrently, the address code operates in combination with the operation code (BRT) to identify, or page the particular device to be read. The high at the NAND gate output terminal 57 is also applied to the AND gate input terminal 59. The high resulting from the BRT operation code appears on the BRT bus 51 and is applied to the other input terminal 55, thus operating the AND gate 56 to drive the EXP bus 66 high and the $\overline{EXP}$ bus 68 low. The manner in which the actuate, or logic signal on the buses 66 and 68 operate to page a particular input circuit is described below.

Referring to FIG. 1, a divider circuit includes an OR gate 69 having four input terminals 70–73 connected to the most significant digit output terminals $14_{4-7}$, respectively. Its output terminal 74 connects to a DIV bus 75 and to the input of a NOT gate 140. The output of the NOT gate 140 connects to a $\overline{DIV}$ bus 75'. When an instruction read from the memory matrix 1 contains an address code equal to or greater than 40 (octal), one of the most significant digit output terminals $14_{4-7}$ goes high. As a result, the OR gate output terminal 74 and DIV bus 75 are driven high. The function which the divider circuit serves will become evident from the description to follow.

Referring to FIG. 1, an electronic switch circuit connects to the programmable controller to provide a second means of expanding its input-output capacity. Connected to the address decoder 13 are first and second input AND gates 76 and 77, and an input NAND gate 78. One input terminal of each input gate 76, 77 and 78 is connected to the most significant digit output terminal $14_0$ of the address decoder 13. A second input terminal $15_2$, a second input terminal on the second input AND gate 77 connects to the least significant digit output terminal $15_3$, and a second input terminal on the input NAND gate 78 connects to the least significant digit output terminal $15_1$ on the address decoder 13. A third input terminal on the input NAND gate 78 connects to the output terminal 79 of a SET AND gate 80. One input terminal of the SET AND gate 80 connects to the SET bus 50, and the other input terminal connects to the clock pulse generator 12. An output terminal 81 of the first input AND gate 76 connects to a J terminal 82 on a first storage flip-flop 83 and connects to a K terminal 84 on a second storage flip-flop 85. The flip-flops 83 and 85 are identical to the J-K flip-flops 25 used in each of the output circuits described above. An output terminal 86 on the second input AND gate 77 connects to a K terminal 87 on the first storage flip-flop 83 and connects to a J terminal 88 on the second storage flip-flop 85. A clock terminal 89 on the first storage flip-flop 83 and a clock terminal 90 on the second storage flip-flop 85 connect to the output terminal 79 of the SET AND gate 80. An output terminal 91 of the input NAND gate 78 connects to a direct reset terminal 92 on the first storage flip-flop 83 and a direct reset terminal 93 on the second storage flip-flop 85. The direct reset terminals 92 and 93 operate, when driven to a logic low, to reset the flip-flops 83 and 85 without the application of the voltage step to their clock terminals 89 and 90.

The storage flip-flops 83 and 85 are connected to first, second and third output AND gates 94, 95 and 96. A Q terminal 97 on the first storage flip-flop 83 connects to an input terminal 98 on the second output AND gate 95, and a $\overline{Q}$ terminal 99 connects to an input terminal 100 on the first output AND gate 94 and an input terminal 101 on the third output AND gate 96. A Q terminal 102 on the second storage flip-flop 85 connects to an input terminal 103 on the third output AND gate 96, and a $\overline{Q}$ terminal 104 connects to an input terminal 105 on the first output AND gate 94 and an input terminal 106 on the second output AND gate 95. The output of the first output AND gate 94 connects to a 01 bus 107, the output of the second output AND gate 95 connects to a 02 bus 108, and the output of the third output AND gate 96 connects to a 03 bus 109.

When a SET instruction containing the coded address 01, 02 or 03 is read from the memory matrix 1, the electronic switch circuit is operated to apply a logic high, or enabling signal, to the corresponding bus 107, 108, or 109. More specifically, when a SET 01 instruction is read from the memory matrix 1, the SET bus 50 goes high and the output terminal 79 of the SET AND gate 80 goes high when a clock pulse is generated. As a result, all three input terminals to the input NAND gate 78 are high, and a low is generated to the direct reset terminals 92 and 93 on the storage flip-flops 83 and 85. The storage flip-flops 83 and 85 are thus reset, driving their $\overline{Q}$ terminals 99 and 104 high. Both input terminals 100 and 105 on the first output AND gate 94 are high, therefore, and a logic high is generated on the 01 bus 107. When a SET 02 instruction is read from the memory matrix 1, the output terminal 81 of the first input AND gate 76 is high. A clock pulse is applied through the SET AND gate 80 to the clock terminals 89 and 90 of the flip-flops 83 and 85, and in response, the first storage flip-flop 83 is set by the high applied to its J terminal 82, and the second storage flip-flop 85 is reset by the high applied to its K terminal 84. As a result, the Q terminal 97 of the first storage flip-flop 83 is high, and the $\overline{Q}$ terminal 104 of second storage flip-flop 85 is high. Both input terminals 98 and 106 of the second output AND gate 95 are driven high, and a logic high is generated to the 02 bus 108. Finally, when a SET 03 instruction is read from the memory matrix 1, the output terminal 86 of the second input AND gate 77 is high. The clock pulse applied through the SET AND gate 80 to the storage flip-flops 83 and 85 causes the first storage flip-flop 83 to reset and the second storage flip-fop 85 to set. The $\overline{Q}$ terminal 99 of the first storage flip-flop 83 and the Q terminal 102 of the second storage flip-flop 85 are, therefore, in a logic high state and both input terminals 101 and 103 of the third output AND gate 96 are high. As a result, the 03 bus 109 is driven to a logic high state. The logic high generated to the buses 107, 108 and 109 are retained until another SET 01, SET 02 or SET 03 instruction is read from the memory matrix 1 to operate the electronic switch circuit.

Figure 2:
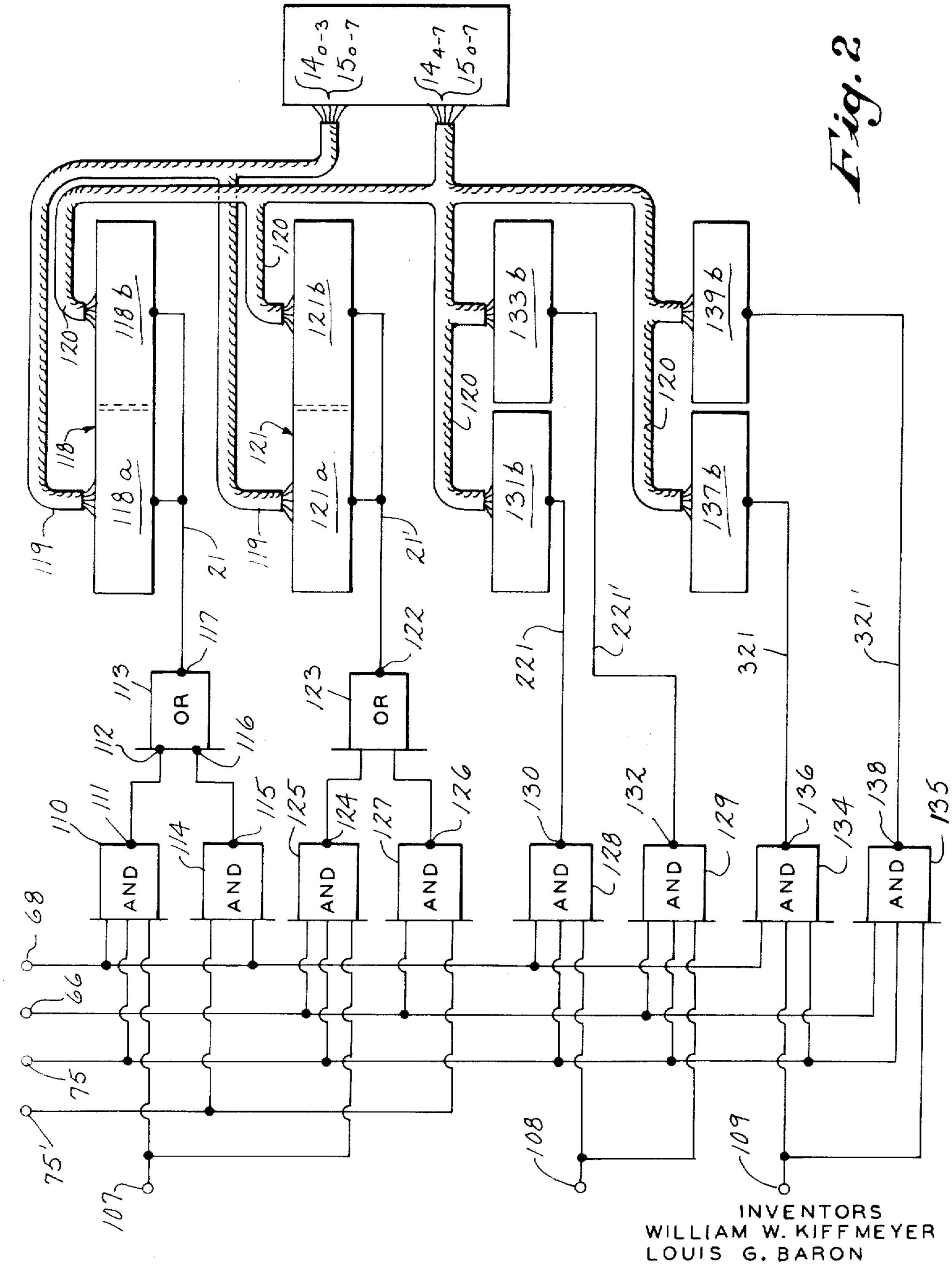
FIG. 2 is a schematic diagram of the summing circuit of the invention and the address banks.

Referring to FIG. 2, the signals on the buses 66, 68, 75, 107, 108 and 109 are connected to a summing circuit comprised of a series of logic gates connected to a series of address banks. A first summing AND gate 110 has an input terminal connected to the $\overline{EXP}$ bus 68, an input terminal connected to the DIV bus 75, and an input terminal connected to the 01 bus 107. An output terminal 111 of the first summing AND gate 110 connects to an input terminal 112 on a first OR gate 113. A second summing AND gate 114 has an input terminal connected to the $\overline{DIV}$ bus 75', and an input terminal connected to the $\overline{EXP}$ bus 68. Its output terminal 115 connects to a second input terminal 116 on the first OR gate 113.

An output terminal 117 on the first OR gate 113 connects to the address bank bus 21 leading to each of 59 separate input-output circuits located in a first address bank 118. The address bank 118 is divided into two sections, a lower section 118*a* and an upper section 118*b*. The lower section 118*a* is connected by a cable 119 to the address decoder 13 to receive activate signals therefrom when any address from 4 to 37 (octal) is read from the memory matrix 1. The upper section 118*b* is connected by a second cable 120 to the address decoder 13 to receive activate signals for the addresses 40 through 76 (octal). Thus, 28 separate input-output circuits can be mounted in the lower address bank 118*a*, and 32 separate input-output circuits can be mounted in the upper address bank 118 *b*. Any one of these 59 circuits can be paged by addressing it through the appropriate cable, first cable 119 or the second cable 120, and concurrently generating a logic high on the address bank bus 21.

A logic high is generated on the address bank bus 21 when either of two conditions exist on the buses connected to the summing circuit. First, if the 01 bus 107, the DIV bus 75, and $\overline{EXP}$ bus 68 are high, the output terminal 111 of the first summing AND gate 110 goes high. Likewise, if the $\overline{DIV}$ bus 75' and $\overline{EXP}$ 68 are both high, the output terminal 115 of the second summing AND gate 114 is high. The high at either one of these output terminals 111 or 115 is conveyed through the OR gate 113 to drive the address bank bus 21 high.

A second address bank 121, similar to the first address bank 118, is connected to the address decoder 13 and to an address bank bus 21'. The address bank bus 21' is connected to an output terminal 122 of a second OR gate 123 in the summing circuit. One input terminal of the OR gate 123 is connected to an output terminal 124 of a third summing AND gate 125, and another input terminal is connected to an output terminal 126 of a fourth summing AND gate 127. Three input terminals of the third summing AND gate 125 are connected similarly to the three input terminals on the first summing AND gate 110, with the exception that a connection has been changed from the $\overline{EXP}$ bus 68 to the EXP bus 66. Two input terminals on the fourth summing AND gate 127 are connected similarly to the two input terminals of the second summing AND gate 114, with the exception that a connection is changed from the $\overline{EXP}$ bus 68 to the EXP bus 66.

Any one of the 59 separate input circuits located in the second address bank 121 can be paged by a BRT instruction accompanied by the appropriate address code. As explained above, when a BRT operation code is accompanied by an address code, the EXP bus 66 goes high, and the $\overline{EXP}$ bus 68 goes low. As a result, the first address bank 118 is deactivated by the summing circuit and the second address bank 121 is activated by a logic high applied through the address bank bus 21'. When the address is less than 40, this logic high is generated by the output terminal 126 of the fourth summing AND gate 127. The appropriate input circuit in the second address bank section 121*a* is addressed simultaneously through the cable 119. Similarly, when a BRT instruction is accompanied by an address greater than 40 (octal), the output terminal 124 of the third summing AND gate 125 drives the address bank bus 21' high. The appropriate input circuit in the second address bank section 121*b* is addressed through the second cable 120.

It should be apparent from the description thus far, that the number of addressable circuits can be nearly doubled by automatically converting the normally non-addressable operation (BRT) into an addressable operation (XIC). Thus, without increasing the word size of the memory matrix 1, a significant number of input circuits can be added to the programmable controller. One apparent limitation of this method of expanding the capacity of the controller results from the automatic conversion of the BRT instruction into an XIC instruction. More specifically, only input circuits can be plugged into the second address bank 121 because only a "passive" XIC operation can be performed on the circuits therein. This apparent limitation, however, is not real in actual application, because at least half (and usually more) of the devices attached to the programmable controller are input devices. Therefore, the output circuits can be assigned addresses in the first address bank 118, where either XIC, XIO, or SET operations can be performed on them and the input circuits are assigned to the second address bank.

Additional input-output circuits located in additional address banks to be described below, are paged by switching the logic high on the 01 bus 107, to the 02 bus 108, or the 03 bus 109 to enable them. This is accomplished by a SET instruction accompanied by an 01, 02, or 03 address code which operates the electronic switch circuit as described above.

The 02 bus 108 is connected to an input terminal on a fifth summing AND gate 128 and to an input terminal on a sixth summing AND gate 129. A second input terminal on the fifth summing AND gate 128 is connected to the $\overline{EXP}$ bus 68, and a third input terminal connects to the DIV bus 75. An output terminal 130 on the fifth summing AND gate 128 connects through an address bank bus 221 to the input-output circuits in a third address bank 131*b*. The third address bank 131*b* contains 31 input-output circuits, each addressable through the second cable 120. The input terminals of the sixth summing AND gate 129 are connected similarly, however, a connection is changed from tne $\overline{EXP}$ bus 68 to the EXP bus 66. An output terminal 132 on the sixth summing AND gate 129 connects through an address bank bus 221' to a fourth address bank 133*b*. The fourth address bank 133*b* contains thirty-one separate input circuits, each addressable through the second cable 120.

An input or output circuit in the third and fourth address banks 131*b* and 133*b* is paged when a logic high is applied to the 02 bus 108 and the instruction read from the memory matrix 1 has an address code of 40 or greater (octal). When a SET, XIO, XIC, or BRT 77 instruction is read from the memory matrix 1, an input, or output, circuit in the third address bank 131*b* is paged. On the other hand, when a BRT instruction with an address code of 40 or greater is read from the memory matrix 1, an input circuit in the fourth address bank 133*b* is paged.

The o3 bus 109 is connected to an input terminal on a seventh summing AND gate 134, and to an input terminal on an eighth summing AND gate 135. A second input terminal on each AND gate 134 and 135 connects to the DIV bus 75, a third input terminal on the seventh summing AND gate 134 connects to the $\overline{\text{EXP}}$ bus 68, and a third input terminal on the eighth summing AND gate 135 connects to the EXP bus 66. An output terminal 136 on the seventh summing AND gate 134 connects through an address bank bus 321 to a fifth address bank 137b. An output terminal 138 on the eighth summing AND gate 135 connects through an address bank bus 321' to a sixth address bank 139*b*. Each address bank 137*b* and 139*b* contains 31 circuits, each addressable through the second cable 120. When the 03 bus 109 is high, circuits in the fifth and sixth address banks 137*b* and *b* are enabled and paged by instructions having address codes of 40 or greater (octal). When SET, XIC, XIO, or BRT 77 instructions are read from the memory matrix 1, an input or output circuit in the fifth address bank 137*b* is paged, whereas BRT instructions having an address code equal to or greater than 40 (octal) will page an input circuit in the sixth address bank 139*b*.

It should be noted that even when the 02 bus 108 or 03 bus 109 is high, the input-output circuits in the lower sections 118*a* and 121*a* of the first and second address banks 118 and 121 are enabled and can be paged. Rather than repeatedly shifting the logic high between the 01 bus 107, the 02 bus 108, and the 03 bus 109, with SET instructions, circuits which are paged frequently in the program are assigned addresses in either the lower section 118*a* of the first address bank or the lower section 121*a* of the second address bank. Thus, instructions paging these circuits can be intermingled with instructions paging circuits in any of the other enabled address banks without preceding it with a SET 01 instruction. The number of circuits in each section of the first and second address banks 118 and 121 has been arbitrarily set to divide the address banks roughly in half. This division is accomplished by the divider circuit acting through the DIV bus 75 and $\overline{\text{DIV}}$ bus 75'. More specifically, the connection of the OR gate 69 in FIG. 1, to the address decoder 13 determines the point of division of the address sections. When fewer common, or often-paged circuits are needed, the capacity of the lower sections 118*a* and 121*a* can be easily decreased by adding additional lines between the address decoder output terminals and input terminals on the OR gate 69. Since the number of addressable input-output circuits contained in the third, fourth, fifth and sixth address banks 131*b*, 133*b*, 137*b* and 139*b* is limited to the number contained in the upper sections 118*b* and 121*b* of the first and second address banks 118 and 121, it is desirable to minimize the size of the lower sections 118*a* and 121*a* in order to increase the total capacity of the programmable controller.

It should be apparent to those skilled in the art that the capacity of the programmable controller described can be easily expanded further than that shown. For example, by adding additional storage flip-flops and associated logic gates to the electronic switch circuit of FIG. 1, additional address banks can be enabled. Of course, each such addition requires that another specific address code be reserved to operate the electronic switch thus diminishing the number of address codes and consequently the number of circuits which can be paged in each address bank. However, the invention contemplates that operation instructions in addition to the SET instruction described herein may be used to switch between, or enable address banks. Also, the invention contemplates that the programmable controllers may have other non-addressable operating instructions other than the BRT instruction described herein. In such case, further expansion can be accomplished by accompanying these non-addressable operating instructions with addresses and providing means to automatically perform an addressable operation on the circuit at that address. Further, although the non-addressable BRT operation described herein automatically converted to an addressable read operation (XIC), the invention contemplates that the non-addressable operation instruction may also be converted by appropriate circuit means to an active addressable operation such as the SET operation desribed herein.

We claim:

1. In a programmable controller having a memory which stores a set of instructions that are sequentially read out, each instruction including an address code which selects a circuit in an address bank, and each instruction including an operation code which selects a function to be performed by a central logic unit in the programmable controller, the improvement therein comprising an expander circuit which includes:

a plurality of pairs of address banks;

a summing circuit connected to each of said pairs of address banks;

an electronic switch circuit connected to said summing circuit to selectively enable one of said pairs of address banks in response to an instruction read from the controller memory; and a gate circuit connected to said summing circuit to selectively activate one of said enabled address banks in response to an instruction read from the controller memory which includes both a non-addressable operation code and an address code;

wherein a circuit in said enabled, activated address bank is paged by said address code.

2. The expander circuit as recited in claim 1 wherein said electronic switch circuit includes a plurality of flip-flops responsive to selected instructions read from said controller memory to selectively enable one of said address bank pairs by generating an enabling signal to said summing circuit.

3. The expander circuit as recited in claim 2 wherein said gate circuit includes a logic gate responsive to selected instructions read from said controller memory to activate one of said address banks in each pair by generating an actuate signal to said summing circuit.

4. The expander circuit as recited in claim 3 wherein said summing circuit includes a plurality of summing logic gates, each summing logic gate having an output terminal connected to an address bank, one input terminal connected to the electronic switch circuit, and one input terminal connected to said gate circuit, wherein a circuit in an address bank is activated and enabled when its attached summing logic gate received an enabling signal from said electronic switch circuit and an activate signal from said gate circuit.

5. In a programmable controller having a memory which stores a set of instructions that are sequentially read out, each instruction including an address code which selects an input or output device connected to a first address bank in the programmable controller, and each instruction including an operation code which selects a function to be performed by a central logic unit in the programmable controller, the improvement therein comprising an expander circuit which includes:

gate means having a first input terminal connected sense the operation code in each instruction read from said memory, a second input terminal connected to sense the address code in each instruction read from said memory, and an output terminal connected to said central logic unit and said first address bank; and a second address bank connected to said gate means and being responsive to the address code in each instruction read from said memory, wherein said operation codes are either addressable or non-addressable and said gate means is responsive to each instruction which includes both a non-addressable operation code and an address code to generate a preselected addressable operation signal to said central logic unit, to deactivate said first address bank, and to activate said second address bank.

6. The circuit as recited in claim 5 in which the programmable controller includes an address decoder connected to receive the address code in each instruction read from the memory and an operation decoder connected to receive the operation code in each instruction read from the memory, wherein said gate means includes:

a first logic gate having a first input terminal connected to said operation decoder, a second input terminal connected to said address decoder, and an output terminal connected to said central logic unit;

an EXP bus connected to the output terminal of said first logic gate and to one of said address banks;

a NOT gate having an input terminal connected to said EXP bus and an output terminal; and an $\overline{EXP}$ bus connected to the output terminal of said NOT gate and to the other of said address banks.

* * * * *

PO-1050
(5/69)

UNITED STATES PATENT OFFICE
CERTIFICATE OF CORRECTION

Patent No. 3,806,877 Dated April 23, 1974

Inventor(s) William W. Kiffmeyer and Louis G. Baron

It is certified that error appears in the above-identified patent and that said Letters Patent are hereby corrected as shown below:

| | |
|---|---|
| Column 1, line 23 | "too" should be -- tool -- |
| Column 2, line 1 | "input-putput" should be -- input-output -- |
| Column 2, line 4 | after "tional" add -- address -- |
| Column 2, line 15 | "(SET)," should be -- (SET). -- |
| Column 2, line 46 | after "activate" add -- a second address bank, and direct the central logic unit to perform an addressable -- |
| Column 3, line 18 | "thereof" should be -- hereof, -- |
| Column 4, line 54 | "actached" should be -- attached -- |
| Column 7, line 57 | after "terminal", first occurrence, add -- on the first input AND gate 76 connects to the least significant digit output terminal -- |
| Column 9, line 39 | "32" should be -- 31 -- |
| Column 11, line 17 | "o3" should be -- 03 -- |
| Column 11, line 33 | "and b" should be -- and 139b -- |
| Column 12, line 34 | "desribed" should be -- described -- |
| Claim 4, Column 13, line 11 | "received" should be -- receives -- |
| Claim 5, Column 13, line 24 | after "connected" add -- to -- |

Signed and sealed this 22nd day of October 1974.

(SEAL)
Attest:

McCOY M. GIBSON JR.
Attesting Officer

C. MARSHALL DANN
Commissioner of Patents